(No Model.)

C. T. WATERS.
COMBINED PLANTER AND FERTILIZER DISTRIBUTER.

No. 366,904. Patented July 19, 1887.

WITNESSES:
Fred G. Dieterich
Leon C. Kemon

INVENTOR:
C. T. Waters
BY Munn & Co
ATTORNEYS.

UNITED STATES PATENT OFFICE.

CHARLES THOS. WATERS, OF BUTLER, GEORGIA.

COMBINED PLANTER AND FERTILIZER-DISTRIBUTER.

SPECIFICATION forming part of Letters Patent No. 366,904, dated July 19, 1887.

Application filed April 20, 1887. Serial No. 235,547. (No model.)

*To all whom it may concern:*

Be it known that I, CHARLES THOS. WATERS, of Butler, in the county of Taylor and State of Georgia, have invented a new and useful Improvement in Combined Planters and Fertilizer-Distributers, of which the following is a specification.

This invention has relation to improvements in combined planters and fertilizer-distributers, the same being adapted to plant cotton-seed, seed-corn, peas, &c., and to drop or distribute fertilizers; and the invention consists of the sundry combinations of parts, including their construction, substantially as hereinafter set forth, and pointed out in the claim.

Figure 1:
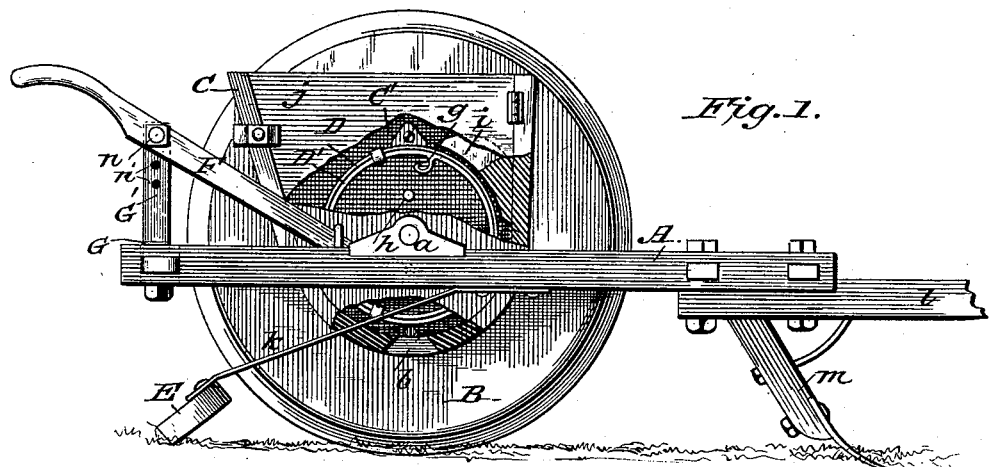
Figure 2:
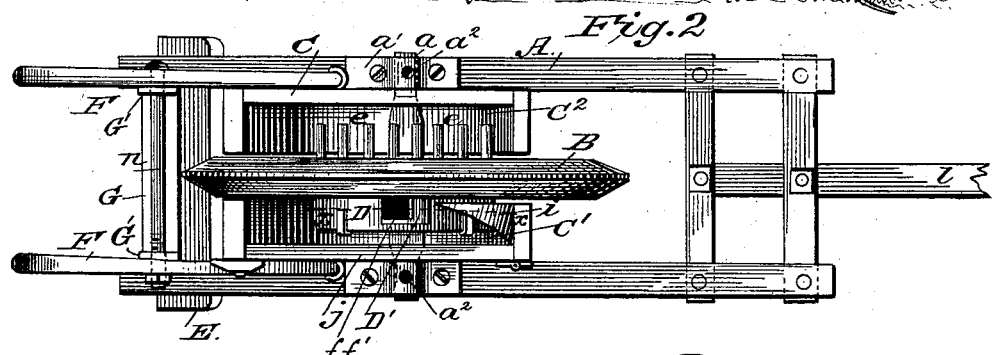
Figure 4:
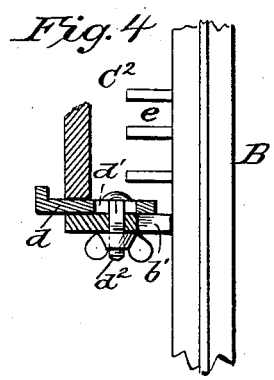
Figure 3:
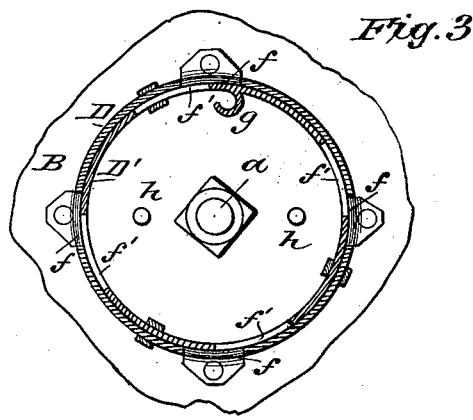

In the accompanying drawings, Figure 1 is a side elevation, partly in section, of my improved planter. Fig. 2 is a top plan view thereof. Fig. 3 is a detail sectional view, partly broken away, of the same; and Fig. 4 is also a detail view, mainly in elevation and partly in section, and with parts broken away.

In the embodiment of my invention I mount upon a frame, A, an axle, $a$, journaled in suitable boxes, $a'$, bolted to the upper side of the longitudinal bars of said frame, and which boxes are provided with apertures $a^2$ for supplying a lubricant to the bearings of the axle. This axle passes through, and upon it is secured, a bevel-edged wheel, B, which serves both to transport the machine and to open the furrow for the reception of the seed and the fertilizer.

C is a hopper, which comprises two compartments or chambers, C' C², the wheel B dividing the same in two, and which hopper is bolted to and between the frame, its lower portion depending a short distance below the frame. The bottoms of these chambers or compartments C' C² are semicircular or concaved in order to concentrate the contents at the discharge or delivery openings $b\ b'$ therein.

In alignment with the opening $b'$ is arranged to slide a handled cut-off or slide, $d$, having its longitudinal edges resting upon said bottom. In order to effect the adjustment and retention of said slide or cut-off in varying the dropping capacity of the opening, it is provided with an elongated slot, $d'$, which receives an adjusting-screw, $d^2$, having a nut on its outer end. In this chamber or compartment C² the wheel B is provided with a circular row of pins or stirrers, $e$, for loosening and expediting the dropping of the fertilizer.

In the compartment C' the wheel B is provided with a fixed annulus or plate-like ring, D, provided with a series of apertures or openings, $f$, at suitable intervals apart, and within this annulus or plate-like ring is arranged a similar plate or annulus, D', also having a series of apertures or openings, $f'$, but which latter ring or plate is movable, being clipped to the first-referred-to plate or ring, and provided with a knob or handle, $g$, to permit it to be shifted or slid upon its fellow ring or plate, whereby the openings of the two rings or plates may be caused to either fully or partially register with each other, or the same may be wholly closed. By this arrangement the dropping or planting capacity of the seed compartment or chamber C' may be varied, regulating the amount of seed dropped according to the character of the ground. In the same compartment or chamber, and inside of the plate-like rings, are diametrically-disposed pins or agitators $h$, to agitate or loosen the contents to cause them to freely pass through the delivery or discharge opening in the bottom of the hopper-compartment. Within this same hopper-compartment is also arranged, at the forward end thereof, a shoe or scraper, $i$, the same being disposed in such close proximity to the outer plate-like ring, D, carried by the wheel B, that it will remove any of the contents adhering to the said ring, and thus avoid the same becoming obstructed in its movement.

In the outside of the compartment or chamber C' is a door, $j$, suitably held to its place by a button to permit of convenient access to the handle of the inner movable ring, D', for its adjustment or manipulation.

E is a shoe or coverer adapted to cover the seed, peas, or corn and the fertilizer. This shoe or coverer is suspended or depends from the frame A at its rear end, being connected to the lower ends of spring or flat metal bars or arms $k$, the upper ends of which are carried forward and bolted to the under side of the side pieces of the frame A, just forward of the axle $a$. The forward end of the frame has bolted centrally to its under side the hitching or draft beam $l$, extending a short distance beyond the forward end of the frame, and to the lower side of said beam is bolted and braced the usual obliquely-disposed shovel or plow standard, m, for primarily opening the furrow.

F F are the handles applied to the rear end of the frame A, their forward lower ends being inserted under staples driven into the frame, while near their upper ends they are united by a rod, n, passed through them and the upright portions or arms G' G' of an inverted approximately bail-shaped support, G, the horizontal portion of which is bolted to the rear cross-bar of the frame A. The arms or upright portions G' G' of the support G are each provided with a series of adjusting-apertures, n', through which is passed the ends of the rod n to permit of the vertical adjustment of the handles to adapt or accommodate them to the height of the plowman or attendant.

It will be remarked that both sides of the wheel, instead of one side, as above described, may be provided with a circular row of pins or stirrers, the use entirely of plate-like rings in that case being dispensed with, the machine thereby being converted into a combined cotton-seed sower and a fertilizer-distributer.

Having thus described my invention, what I claim as new is—

The planter consisting of the two part or compartment receptacle, one compartment having in its bottom an opening controlled by a slide and the other compartment having also in its bottom an opening, the wheel provided upon one side with a series of projections or pins, while upon its opposite side said wheel is provided with a fixed apertured plate-like ring inclosing a movable apertured plate-like ring, and with an additional series of projections or pins, and the frame carrying said receptacle, a coverer, and the shovel with its standard, substantially as set forth.

CHARLES THOS. WATERS.

Witnesses:
J. B. FOWLER,
C. C. WEST.